United States Patent [19]

Hughes, Jr.

[11] Patent Number: 5,040,323

[45] Date of Patent: Aug. 20, 1991

[54] FISHING DEVICE AND METHODS OF CONSTRUCTING AND UTILIZING SAME

[75] Inventor: Vernon E. Hughes, Jr., Walled Lake, Mich.

[73] Assignee: Loretta Hall, Union Lake, Mich.

[21] Appl. No.: 562,938

[22] Filed: Aug. 6, 1990

[51] Int. Cl.$^5$ .............................................. A01K 87/00
[52] U.S. Cl. ........................................ 43/18.1; 43/4; 43/17
[58] Field of Search ................... 43/17, 4, 18.1, 24

[56] References Cited

U.S. PATENT DOCUMENTS

| | | | |
|---|---|---|---|
| 2,394,706 | 2/1946 | Makie | 43/24 |
| 3,186,122 | 6/1965 | Clock et al. | 43/24 |
| 3,727,338 | 4/1973 | Pedersen | 43/18.1 |
| 4,043,070 | 8/1977 | Lamothe . | |
| 4,151,672 | 5/1979 | Lopez . | |
| 4,212,126 | 7/1980 | Barnett | 43/24 |
| 4,654,994 | 4/1987 | Roberts, Jr. . | |
| 4,805,336 | 2/1989 | Heyerman | 43/17 |

FOREIGN PATENT DOCUMENTS 3839168  8/1989  Fed. Rep. of Germany .......... 43/17

Primary Examiner—Richard K. Seidel
Assistant Examiner—Patty E. Hong
Attorney, Agent, or Firm—Irving M. Weiner; Robert M. Petrik; Joseph P. Carrier

[57] ABSTRACT

A fishing device designed for use during spearfishing or ice fishing in an ice shanty. The device includes a sound emanating reel. The line from the reel enters a tube and emerges from the end of the tube to prevent line freeze. The device includes a suspension arrangement for use while suspending a decoy during spearfishing.

4 Claims, 1 Drawing Sheet

FISHING DEVICE AND METHODS OF CONSTRUCTING AND UTILIZING SAME

BACKGROUND OF THE INVENTION

1. Field of the Invention

The present invention relates to a device used while angling or spearfishing during the winter months, normally referred to as ice fishing. More particularly, the present invention provides an improved fishing pole and reel combination for use with a decoy for spearfishing or live bait for angling. The pole includes a sound-emanating reel and a hollow tube pole. Preferably the line from the reel enters the tube to prevent the line from freezing.

2. Description of the Relevant Art

The previous relevant art has had several shortcomings which are solved by the present invention.

U.S. Pat. No. 4,043,070 discloses a rod mounted upon a tripod for use while ice fishing. The line enters a hollow tube pole but only after passing through several sharp corners which may cause line abrasions. In addition, the pole is designed to balance on the tripod so that when a fish takes the bait, the pole moves up and down, or bobs, indicating the presence of a fish to the angler. This system could result in the loss of fish that sense the resistance of the pole on the tripod and leave the area of the bait.

U.S. Pat. No. 4,151,672 discloses a fishing device designed for use by novice fishermen and children. The pole comprises a hollow tube with the line exiting from one end and secured via a rubber band at the opposite end. The line is stored within the tube. This device does not include a reel and is intended to be approximately eight feet in length.

U.S. Pat. No. 4,654,994 discloses an attachment for a hollow core fishing rod comprising a compressible coil spring as a means to project the line through vegetation on the banks of a body of water. This device merely acknowledges that hollow fishing poles are known.

The present invention provides an improved ice fishing decoy and/or bait fishing pole.

SUMMARY OF THE INVENTION

The present invention provides a hollow fishing rod, sound-emanating reel, reel mounting means and pole suspension means. The reel mounting means secures the sound emanating reel to the rod. A variable drag device is utilized to secure the reel to the reel mounting means. Pole suspension means may be provided at one or both ends.

In a preferred embodiment, the reel is mounted at one end adjacent a suspension means. An angled aperture is provided immediately adjacent the reel mounting means for the line from the reel to enter the hollow tube pole. The pole comprises a hollow tube of PVC or similar material with an outside diameter of ⅝ inch and an inside diameter of 9/16 inch and 13 inches in length.

It is an object of the present invention to provide a fishing device usable with a decoy for spearfishing or with bait for angling.

It is a further object of the present invention to provide an ice fishing device with a low-drag line release and sound-emanating reel.

It is a further object of the present invention to provide a suspended, low-reflection fishing device.

The above and further objects, details and advantages of the invention will become apparent from the following detailed description, when read in conjunction with the accompanying drawings.

DETAILED DESCRIPTION OF THE PREFERRED EMBODIMENT

Figure 1:
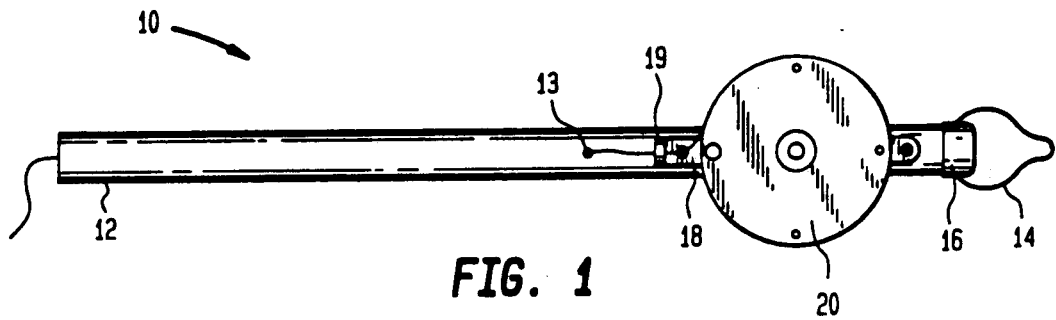
FIG. 1 illustrates a first side view of a fishing device in accordance with the present invention.
Figure 2:
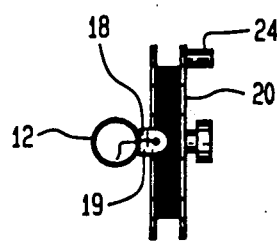
FIG. 2 illustrates a front view of a fishing device in accordance with the present invention.
Figure 3:
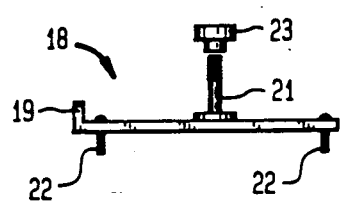
FIG. 3 illustrates a side view of the reel mounting means in accordance with the present invention.

Shown in FIG. 1 is a first embodiment of a fishing device 10 in accordance with the present invention. The fishing device 10 comprises a hollow tube 12, suspension means 14, end cap 16, reel attachment means 18 and reel 20.

Tube 12 includes an angled aperture 13 which permits smooth entry of the line held on the reel 20 into the hollow portion of tube 12. Aperture 13 is directed in a forward direction or towards the open end such that line from reel 20 enters a guide means 19 or reel attachment means 18 and smoothly enters the tube 12. This prevents line abrasion and thus provides for a longer lasting line and a stronger line. End cap 16 is provided on the end of tube 12 adjacent the reel 20. A suspension means 14 is secured through apertures in the end cap 16 and tube 12. Suspension means 14 is used for sensing the device 10 to the inside of an ice "shanty" and comprises a safety-pin type releasable clip.

Reel 20 is held onto the tube 12 by reel attachment means 18 which includes a guide means 19 and reel attachment post 21. Apertures are provided for fastening members 22, preferably screws, to secure means 18 to tube 12. A nut 23 is threadedly received on post 21, preferably with a washer (not shown) between the nut and reel. The nut 23 provides an adjustable drag permitting fingertip control of the pressure on the reel. Means 18 preferably is curved to match the contour of the tube 12.

The reel 20 is of the type which produces a sound upon rotation of the reel in either direction. A known reel of this type is made by H. T. Enterprises, Inc. and is known as a rattle reel. Reel 20 includes a handle 24 which is used to rotate the reel for taking up and releasing line stored thereon. This type of arrangement permits an angler to loosen nut 23 such that the reel freely turns. Upon a bite by a fish, the reel will turn and alert the angler with a rattle noise. In addition, a fish will feel little if any resistance from the line being removed from the reel which increases the chances of catching the fish.

The device 10 is painted black on the outer surfaces to prevent reflections which might alarm approaching fish while spearfishing.

Figure 4:
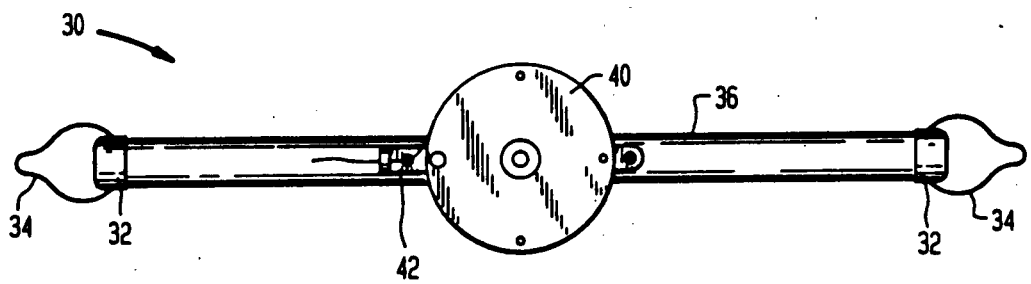
FIG. 4 illustrates a second embodiment of a fishing device in accordance with the present invention.

Shown in FIG. 4 is a second embodiment 30 of a fishing device in accordance with the present invention. Device 30 includes an end cap 32 and suspension means 34 at each end of tube 36. The reel 40 is secured by a reel attachment means 42 similar to that discussed previously. However, the line does not enter tube 36. In this embodiment, device 30 is adapted to be suspended directly over an ice fishing hole.

Although there has been described what is at present considered to be the preferred embodiment of the invention, it will be understood that various modifications and variations may be made therein, and it is intended to cover in the appended claims all such modifications as fall within the true spirit and scope of the invention.

I claim:

1. A device for use while ice fishing, comprising:

a short hollow tube;

reel attachment means which conforms to the contour of the outer portion of said tube secured adjacent a first terminus of said tube; said reel attachment means includes a first end adjacent said first terminus of said tube and a second end, a reel attachment pin integrally formed midway between said first and second ends and securement means for securing said reel attachment means to said tube;

suspension means secured at said first terminus, said first terminus includes a cap member, said suspension means attachable to said device by apertures in said cap member;

a sound emanating fishing reel secured by said reel attachment means to tube; and a line aperture in said tube adapted to permit smooth entry of fishing lines stored on said reel into the center portion of said tube that the line exits a second terminus of said tube.

2. The device of claim 1, wherein:

said reel attachment pin is threaded and a reel drag nut is fitted on said threads such that when the nut is tightened, the drag is increased on said reel.

3. The device of claim 1, wherein:

said hollow tube is approximately 13 inches in length.

4. A device for use while ice fishing, comprising:

a short hollow tube, each end of said tube includes a cap including apertures to accommodate suspension means;

reel attachment means secured midway along the length of said tube; and a sound emanating fishing reel secured by said reel attachment means to said tube.

* * * * *